(12) United States Patent
Haddad

(10) Patent No.: US 10,158,935 B2
(45) Date of Patent: *Dec. 18, 2018

(54) MICROPHONE DISRUPTION APPARATUS AND METHOD

(71) Applicant: Vysk Communications, Inc., San Antonio, TX (US)

(72) Inventor: Waleed Sami Haddad, San Francisco, CA (US)

(73) Assignee: Vysk Communications, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,186

(22) Filed: Jul. 8, 2016

(65) Prior Publication Data

US 2017/0099541 A1    Apr. 6, 2017

Related U.S. Application Data

(63) Continuation of application No. 14/276,298, filed on May 13, 2014, now Pat. No. 9,392,362, which is a
(Continued)

(51) Int. Cl.
| H04R 1/28 | (2006.01) |
| H04R 3/00 | (2006.01) |
| H04R 1/08 | (2006.01) |
| H02K 1/12 | (2006.01) |
| H02K 1/34 | (2006.01) |

(Continued)

(52) U.S. Cl.
CPC ............... *H04R 1/28* (2013.01); *H02K 1/12* (2013.01); *H02K 1/34* (2013.01); *H02K 3/28* (2013.01); *H02K 7/14* (2013.01); *H02K 35/02* (2013.01); *H04R 1/08* (2013.01); *H04R 3/00* (2013.01); *H04R 3/002* (2013.01); *H04M 1/03* (2013.01); *H04M 1/21* (2013.01); *H04R 1/02* (2013.01); *H04R 1/2876* (2013.01); *H04R 11/00* (2013.01);
(Continued)

(58) Field of Classification Search
CPC ... H04R 1/02; H04R 1/08; H04R 1/28; H04R 1/2876; H04R 3/00; H04R 3/082; H04R 11/00; H04R 2400/03; H04R 2410/05
See application file for complete search history.

(56) References Cited

U.S. PATENT DOCUMENTS

| 5,949,892 A | 9/1999 | Stewart |
| 7,581,893 B2 | 9/2009 | Miramontes |

(Continued)

FOREIGN PATENT DOCUMENTS

| JP | 2007065443 | 3/2007 |
| KR | 1020060031900 | 4/2006 |

(Continued)

OTHER PUBLICATIONS

File History for U.S. Appl. No. 14/102,382 as retrieved from the U.S. Patent and Trademark Office.
(Continued)

*Primary Examiner* — Tuan D Nguyen
(74) *Attorney, Agent, or Firm* — Workman Nydegger

(57) ABSTRACT

An apparatus for use with an electronic device having a microphone. The apparatus comprises a structure configured to detachably couple to the device, and a generator supported by the structure. The generator is configured to generate a force that acts on the microphone and renders the microphone unresponsive to voice sounds.

21 Claims, 13 Drawing Sheets

Related U.S. Application Data continuation of application No. 14/102,382, filed on Dec. 10, 2013, now Pat. No. 8,731,186.

(51) Int. Cl.
*H02K 3/28* (2006.01)
*H02K 7/14* (2006.01)
*H02K 35/02* (2006.01)
*H04R 1/02* (2006.01)
*H04R 11/00* (2006.01)
*H04M 1/03* (2006.01)
*H04M 1/21* (2006.01)

(52) U.S. Cl.
CPC ...... *H04R 2400/03* (2013.01); *H04R 2410/05* (2013.01); *H04R 2499/11* (2013.01)

(56) References Cited

U.S. PATENT DOCUMENTS

| | | | |
|---|---|---|---|
| 7,728,906 | B2 | 6/2010 | Bilbrey |
| 8,004,603 | B2 | 8/2011 | Nozaki |
| 8,253,852 | B2 | 8/2012 | Bilbrey |
| 8,432,485 | B1 | 4/2013 | Martinez et al. |
| 8,471,956 | B2 | 6/2013 | Fortmann |
| 8,496,390 | B2 | 7/2013 | Ohuchi et al. |
| 8,724,020 | B1 | 5/2014 | Haddad |
| 8,731,186 | B1 | 5/2014 | Haddad |
| 9,124,792 | B2 | 9/2015 | Barangan et al. |
| 2005/0052567 | A1 | 3/2005 | Huang et al. |
| 2005/0068423 | A1 | 3/2005 | Bear et al. |
| 2005/0225668 | A1 | 10/2005 | Kim |
| 2007/0242948 | A1 | 10/2007 | Miramontes |
| 2008/0187306 | A1 | 8/2008 | Sugiura |
| 2011/0058255 | A1 | 3/2011 | Weiss |
| 2011/0063864 | A1 | 3/2011 | Brown et al. |
| 2011/0065392 | A1 | 3/2011 | Chung |
| 2012/0183156 | A1 | 7/2012 | Schlessinger et al. |
| 2012/0229380 | A1 | 9/2012 | Silvester |
| 2012/0301132 | A1 | 11/2012 | Mitskog et al. |
| 2013/0050549 | A1 | 2/2013 | Bilbrey |
| 2013/0162124 | A1 | 6/2013 | Miyaoka |
| 2013/0222609 | A1 | 8/2013 | Soffer |
| 2015/0163383 | A1 | 6/2015 | Barangan et al. |
| 2015/0163385 | A1 | 6/2015 | Haddad |
| 2015/0163589 | A1 | 6/2015 | Haddad |
| 2016/0065817 | A1 | 3/2016 | Haddad |

FOREIGN PATENT DOCUMENTS

| | | |
|---|---|---|
| KR | 100598053 | 7/2006 |
| KR | 101149925 | 5/2012 |

OTHER PUBLICATIONS

File History for U.S. Appl. No. 14/276,298 as retrieved from the U.S. Patent and Trademark Office.
File History for U.S. Appl. No. 14/102,387 as retrieved from the U.S. Patent and Trademark Office.
File History for U.S. Appl. No. 14/276,288 as retrieved from the U.S. Patent and Trademark Office.
File History for U.S. Appl. No. 14/840,602 as retrieved from the U.S. Patent and Trademark Office.
File History for U.S. Appl. No. 14/566,378 as retrieved from the U.S. Patent and Trademark Office.
International Search Report and Written Opinion for PCT Application No. PCT/US2014/069568 dated Mar. 12, 2015, 11 pages.
International Search Report and Written Opinion for PCT Application No. PCT/US2014/069571 dated Mar. 31, 2015, 12 pages.
U.S. Appl. No. 14/566,378, Oct. 6, 2016, Notice of Allowance.
U.S. Appl. No. 14/840,602, Oct. 21, 2016, Notice of Allowance.
U.S. Appl. No. 15/432,440, May 23, 2017, Office Action.
U.S. Appl. No. 15/452,465, May 4, 2017, Office Action.

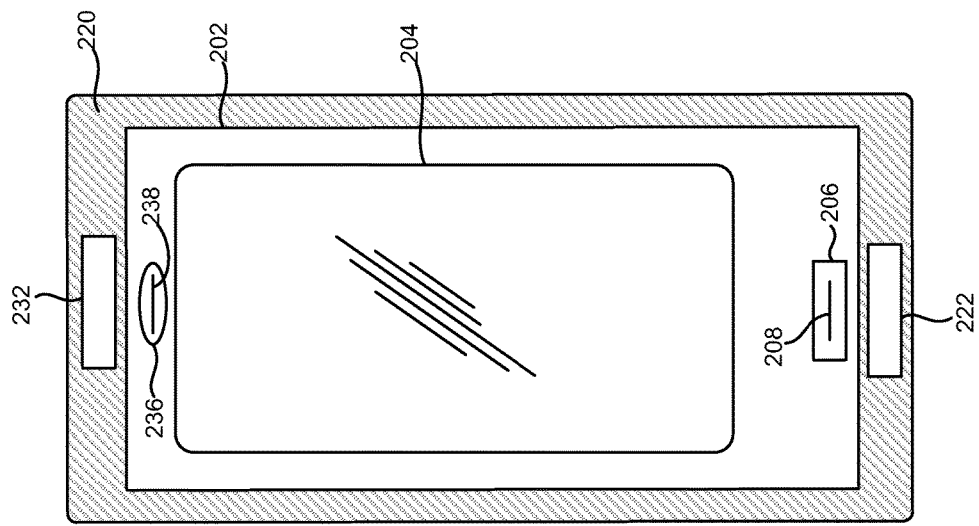
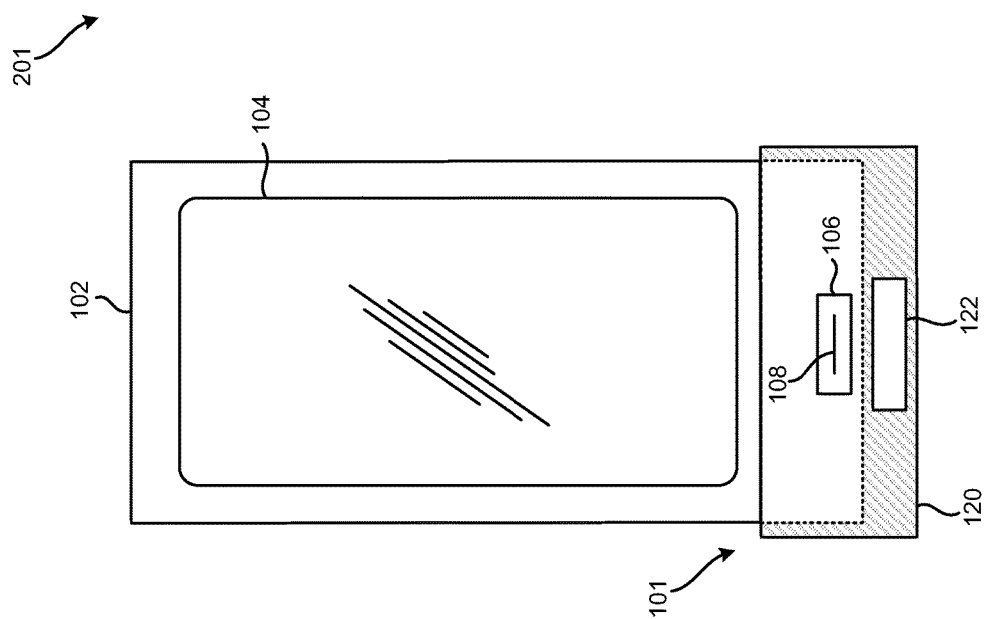

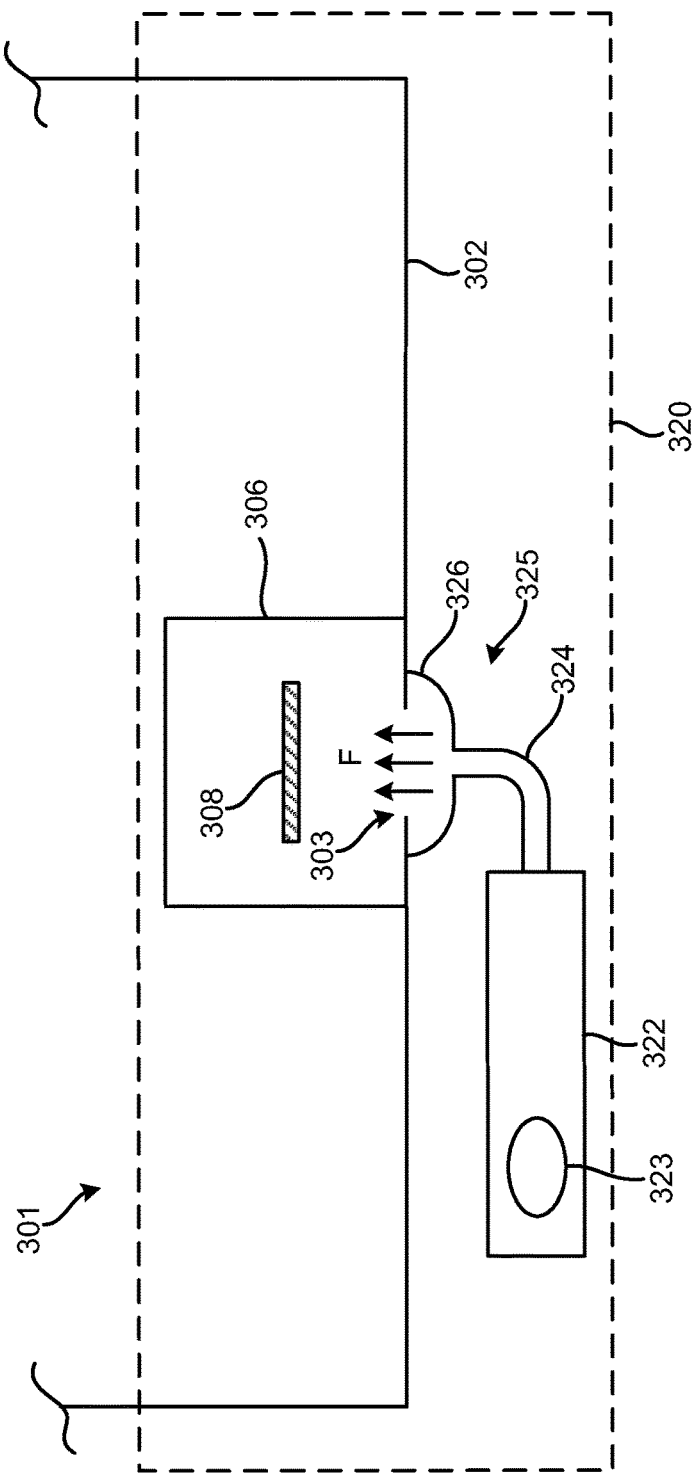

MICROPHONE DISRUPTION APPARATUS AND METHOD

RELATED APPLICATIONS

This application is a continuation of U.S. patent application Ser. No. 14/276,298, filed May 13, 2014 which is a continuation of U.S. patent application Ser. No. 14/102,382, filed Dec. 10, 2013, now U.S. Pat. No. 8,731,186, to which priority is claimed pursuant to 35 U.S.C. § 119(e) and which are hereby incorporated herein by reference.

SUMMARY

Embodiments are directed to an apparatus for use with an electronic device having a microphone. The apparatus comprises a structure configured to detachably couple to the device, and a generator supported by the structure. The generator is configured to generate a force that acts on the microphone and renders the microphone unresponsive to voice sounds.

Other embodiments are directed to an apparatus for use with an electronic device having a microphone. The apparatus comprises a structure configured to detachably couple to the device, and a generator supported by the structure and fluidly coupled to the microphone. The generator is configured to generate air pressure that acts on a diaphragm of the microphone and renders the microphone unresponsive to voice sounds.

Further embodiments are directed to a method involving a microphone of an electronic device. The method involves generating, at a cover or a sleeve detachably coupled to an external surface of the device, a force that is directed at the microphone. The method also involves rendering the microphone unresponsive to voice sounds while the force is acting on the microphone. The force can be air pressure, mechanical vibration or an electric force.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIG. 1 is an illustration of a microphone disruption apparatus for use with an electronic device having a microphone in accordance with various embodiments;

FIG. 2 is an illustration of a microphone disruption apparatus for use with an electronic device having a multiplicity of microphones in accordance with various embodiments;

FIG. 3 illustrates various details of a microphone disruption apparatus for use with an electronic device having a microphone in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 4:
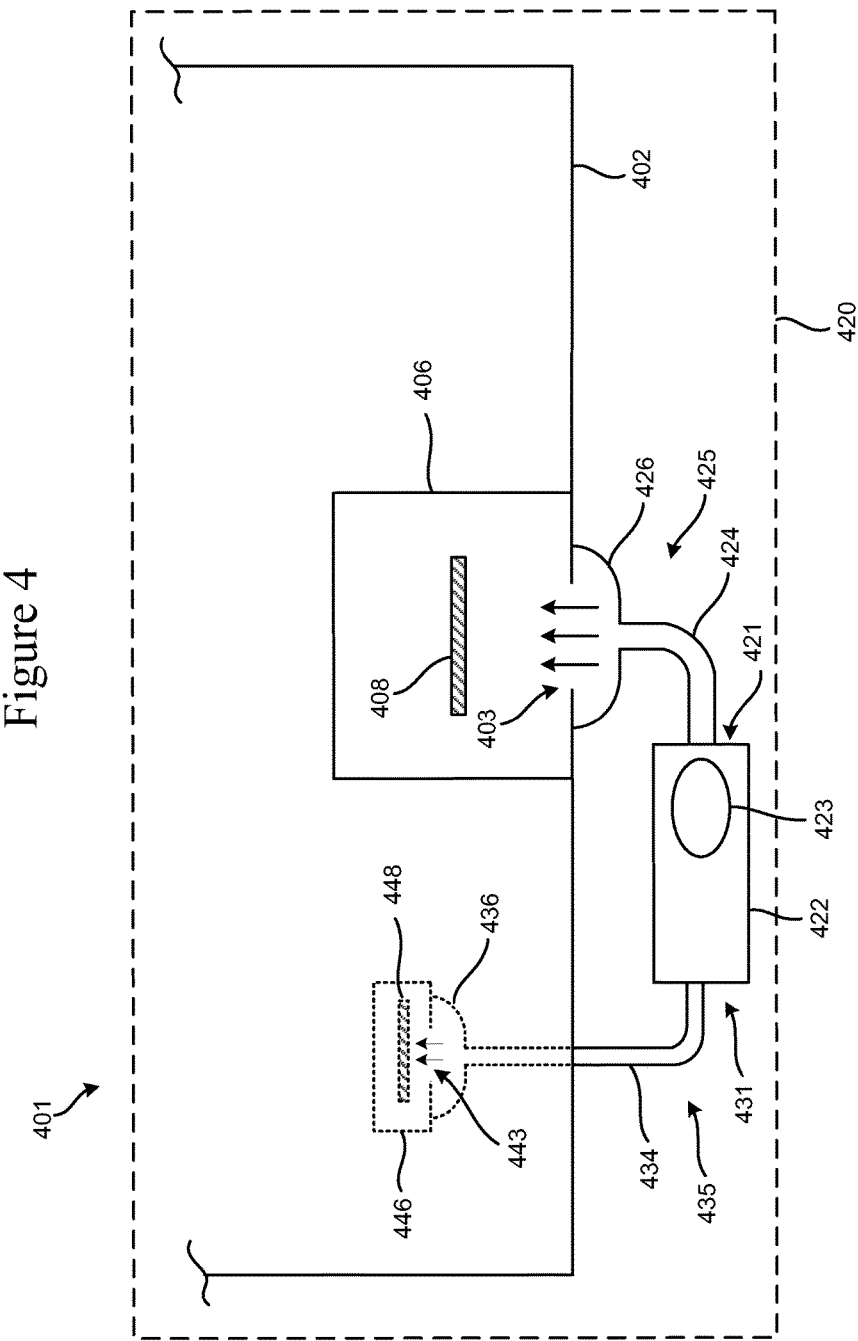
FIG. 4 illustrates various details of a microphone disruption apparatus for use with an electronic device having a multiplicity of microphone in accordance with various embodiments.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Embodiments of the disclosure are directed to an apparatus and method for rendering a microphone of an electronic device temporarily unresponsive to voice sounds. Embodiments of the disclosure are directed to an apparatus and method for rendering a microphone of an electronic device temporarily unresponsive to voice sounds, during a time in which the electronic device is not being used for voice communications. Embodiments of the disclosure are directed to an apparatus and method for rendering a microphone of an electronic device unresponsive to voice sounds, and providing an auxiliary microphone to facilitate secured voice communications during the time in which the microphone of the electronic device is rendered unresponsive to voice sounds.

FIG. 1 is an illustration of a microphone disruption apparatus for use with an electronic device having a microphone in accordance with various embodiments. The apparatus 101 illustrated in FIG. 1 is shown detachably coupled to a hand-held electronic device 102, which includes a display 104 and a microphone 106. The microphone 106 is illustrated as having a diaphragm 108 or other sensing element that is responsive to sounds waves, such as those associated with human voice sounds. The apparatus 101 is coupled to the electronic device 102 so that at least a portion of the apparatus 101 is at or proximate to the microphone 106. According to various embodiments, the apparatus 101 can be configured as a support structure 120, such as a sleeve, a band or a partial cover, that can be detachably affixed to the housing of the electronic device 102.

The apparatus 101 includes a generator 122, which is supported by the support structure 120. The generator 122 is located on the support structure 120 such that the generator 122 is positioned adjacent the microphone 106 of the electronic device 102 when the support structure 120 is properly coupled to the device 102. According to various embodiments, the generator 122 can be selectively activated and deactivated by the user of the electronic device. For example, the generator 122 can be coupled to a switch that is supported by the apparatus 101 and actuatable by a user. Although not shown, the generator 122 incorporates or is coupled to a power source, such as a battery.

The generator 122 is configured to produce a force that acts on the microphone 106 and renders the microphone 106 unresponsive to voice sounds. The force produced by the generator 122 provides for continuous disruptive interference of microphone operation until the generator 122 is deactivated. Upon deactivation of the generator 122, the microphone 106 of the electronic device 102 returns to normal operation. In this regard, the generator 122 delivers a nondestructive force that temporarily renders the microphone 106 unusable for purposes of transducing voice and other human perceivable acoustic information.

According to various embodiments, the generator 122 generates a force that acts on the diaphragm 108 of the microphone 106, and renders the diaphragm 108 unresponsive to voice sounds and other acoustic information. The generator 122, according to some embodiments, generates a force that causes clipping of the microphone 106. For example, the generator 122 may generate a force that causes repeated intermittent clipping of the microphone 106 at a rate that renders the microphone unresponsive to voice sounds and other acoustic information. The generator 122, for example, can generate a force that causes the diaphragm 108 to move to or near to a maximum excursion limit of the diaphragm 108. For example, the generator 122 can generate a force that causes the diaphragm 108 to move cyclically between opposing maximum excursion limits of the diaphragm 108, making contact or near contact with these excursion limits. In other embodiments, the generator 122 generates a force that causes nonlinear distortion of the microphone's output signal. In some embodiments, the force generated by the generator 122 is air pressure. In other embodiments, the force generated by the generator 122 is an electric force. In further embodiments, the force generated by the generator 122 is mechanical vibration.

A microphone is considered unresponsive to voice sounds when its diaphragm or other input energy transducer is unable to transduce voice sounds and other audio source information into an electrical audio signal from which the voice sounds and other audio source information can be faithfully reproduced. For example, a diaphragm of a microphone is considered unresponsive to voice sounds when the diaphragm is unable to vibrate in a manner that corresponds to the voice sounds impinging on the diaphragm due to presence of a disruptive force concurrently acting on the diaphragm. In this scenario, the microphone is unable to produce an electrical audio signal from which the voice sounds impinging on the diaphragm can be faithfully reproduced. As such, a microphone disruption apparatus and methodology of the present disclosure provides for complete privacy from surreptitious use of an electronic device's microphone(s) when such privacy is desired.

A representative condition in which the diaphragm of the microphone is unresponsive to voice sounds due to the presence of a disruptive force acting thereon is referred to as clipping. As was previously discussed, clipping of a microphone occurs when the diaphragm is moved to or near to a maximum excursion the limit of the diaphragm. During clipping, which can be continuous or intermittent at a sufficiently high rate, the diaphragm is unable to vibrate in response to voice sounds in a manner which allows for faithful transducing (e.g., from acoustic energy to electrical energy) and reproduction (from electrical energy to acoustic energy) of the voice sounds. Clipping is inherently nonlinear so the duty cycle of the in-clipping state can be close to 100%. The application of a dynamic continuous modulated force (e.g., pressure signal) delivered directly to the microphone creates repeated intermittent clipping at both poles of the microphone diaphragm motion. Although the diaphragm may be able to vibrate in response to some components of voice sounds during clipping, reproduction of any such components will still result in an unintelligible output audio signal.

Turning now to FIG. 2, there is illustrated a microphone disruption apparatus for use with an electronic device having a microphone in accordance with other embodiments. The apparatus 201 shown in FIG. 2 includes a support structure 220 configured to encompasses at least the peripheral side edges of the electronic device 202. According to some embodiments, the support structure 220 is implemented as a detachable cover arrangement that provides protection for the electronic device 202 and houses components of the microphone disruption apparatus. In some implementations, the support structure 220 is formed as a unitary cover, while in other implementations, the support structure 220 is a multi-piece (e.g., two piece) cover arrangement, such as a snap-fit cover arrangement.

In the embodiment shown in FIG. 2, the microphone disruption apparatus 201 includes a multiplicity of generators 222, 232 configured to disruptively interfere with a multiplicity of microphones 206, 236 of the electronic device 202. In the illustrative embodiment of FIG. 2, the electronic device 202 includes a lower microphone 206 and an upper microphone 238. Although two microphones are shown in FIG. 2, it is understood that the electronic device 220 may include three or more microphones, and that a generator can be provisioned for each of these microphones. As will be described hereinbelow, a single generator can be configured to provide for disruptive interference for a multiplicity of microphones. In general, all of the generators 222, 232 are typically enabled for operation at the same time (e.g., via a switch moved to an ON position), and all of the generators 222, 232 are typically disabled for operation at the same time (e.g., via the switch moved to an OFF position).

FIG. 3 illustrates additional details of a microphone disruption apparatus for use with an electronic device having a microphone in accordance with various embodiments. The apparatus 301 includes a support structure 320 configured to detachably couple to the housing of the electronic device 302. When the apparatus 301 is properly arranged on the device 302, the generator 322 is positioned proximate the inlet port 303 of the microphone 306. Alternatively, the generator 322 can be positioned away from the microphone's inlet port 303, and fluidly coupled to the microphone 306 via a coupling arrangement 325.

In the illustrative embodiment shown in FIG. 3, the inlet port 303 of the microphone 306 is located on the lower edge surface of the housing of the electronic device 302. The generator 322 is coupled to the inlet port 303 of the microphone 306 via the coupling arrangement 325. A switch 323 allows a user to manually activate and deactivate the generator 322 as desired. In some implementations, the switch 323 is located at the generator 322. In other implementations, the switch 323 is located elsewhere on support structure 320.

According to embodiments that employ air pressure, the coupling arrangement 325 includes a plenum or channel 324 and an outlet port 326, which is configured to sealingly engage the housing surface of the electronic device 302 proximate the inlet port 303 of the microphone 306. According to embodiments that employ an electric field, the coupling arrangement 325 includes an electrical element 326 couple to the generator 322 via an electrical connection 324. According to embodiments that employ mechanical vibration, the coupling arrangement 325 includes a mechanical vibrator 326 couple to the generator 322 via an electrical or structural connection 324, depending on the particular vibrator design. As is shown in FIG. 3, the generator 322 produces a force, F, that impinges the diaphragm 308 or other acoustic energy sensing member of the microphone 306, thereby rendering the microphone 306 unresponsive to voice sounds. It is understood that element providing the pressure, electrical or mechanical force on the microphone is generally not in direct contact with the diaphragm of the microphone, and is typically located at or near the surface of an electronic device's housing separated by a small gap from the diaphragm.

FIG. 4 illustrates additional details of a microphone disruption apparatus for use with an electronic device having a microphone in accordance with other embodiments. The apparatus 401 includes a support structure 420 configured to detachably couple to the housing of the electronic device 402. The support structure 420 may be a sleeve or partial cover according to various embodiments, while in other embodiments the support structure 420 can be a full cover. In the embodiment shown in FIG. 4, the support structure 420 supports a generator 422 configured to disruptively interfere with a multiplicity of device microphones 406, 446 positioned on different surfaces of the electronic device 402. In the representative example shown in FIG. 4, the electronic device 420 includes a lower microphone 406 having an inlet port 403 located on a lower edge surface of the device housing. A rear microphone 446 having an inlet port 443 is situated on a rear surface of the housing of the device 402.

The generator 422 includes a first coupling arrangement 425 provided between the inlet port 403 of the lower microphone 406 and a first port 421 of the generator 422. The generator 422 also includes a second coupling arrangement 435 provided between the inlet port 443 of the rear microphone 446 and a second port 431 of the generator 422. When activated, such as by actuation of a switch 423, the generator 422 causes a disruptive force to be delivered to the diaphragms 408, 448 of the lower and rear microphones 406, 446, respectively. The lower and rear microphones 406 and 446 return to normal operation upon the deactivation of the generator 422, such as via actuation of the switch 423.

Figure 5:
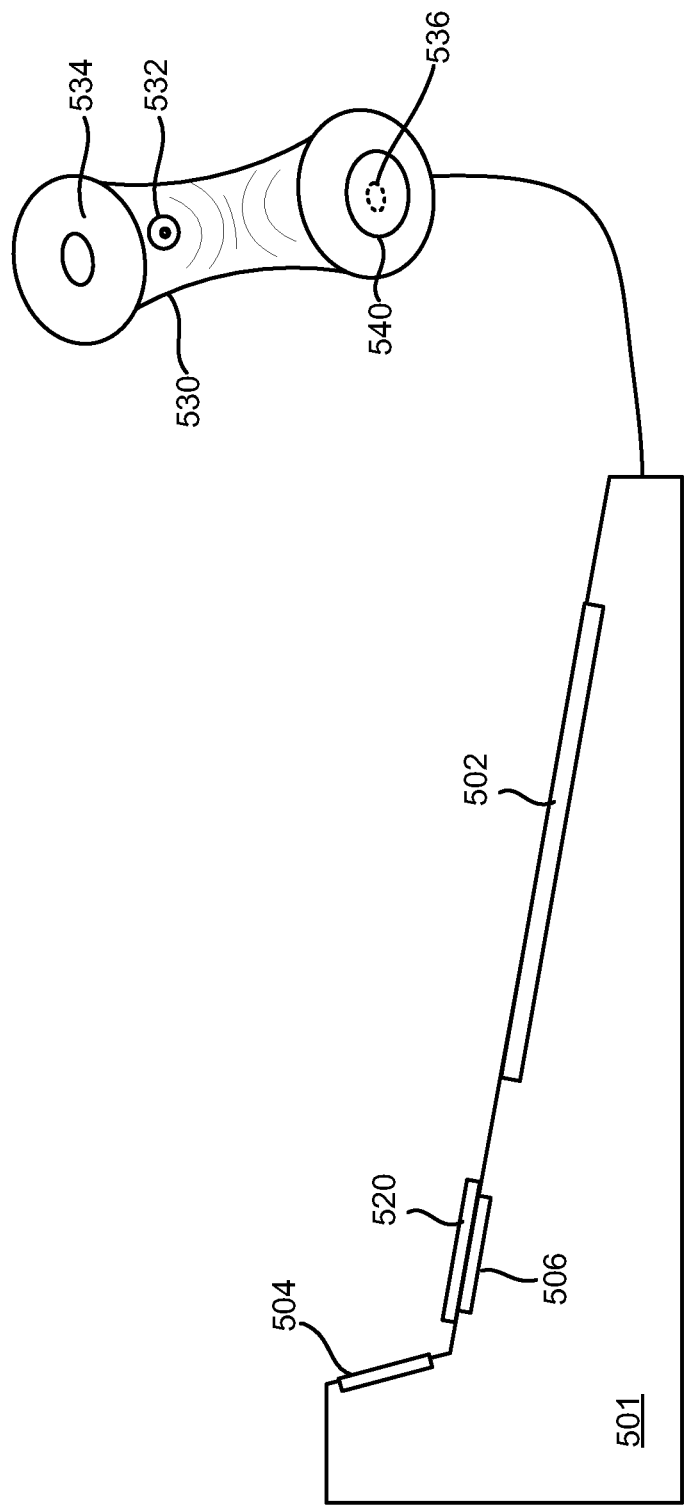
FIG. 5 illustrates a microphone disruption apparatus for use with a stationary electronic device having one or more microphones in accordance with other embodiments.

FIG. 5 illustrates a microphone disruption apparatus for use with a stationary electronic device having a microphone in accordance with other embodiments. The microphone disruption apparatus 520 can be of a type described herein, and can be activated by a user when privacy from surreptitious use of the microphone 506 is desired. The stationary electronic device 501 can take many forms, such as a desktop computer, a desktop telephone, or other type of relatively fixed electronic equipment that includes a microphone. According to the embodiment shown in FIG. 5, a microphone disruption apparatus 520 is positioned proximate a microphone 506 of a desktop telephone 501. The telephone 501 further includes a display 504, a keypad 502, a handset cradle (not shown), and a handset 530.

The handset 530 includes a standard speaker 534 and a second microphone disruption apparatus 540 positioned proximate the microphone 536 of the handset 530. In some embodiments, the second microphone disruption apparatus 540 is built into a mouthpiece cover that replaces the original mouthpiece cover of the handset 530. In other embodiments, the microphone disruption apparatus 540 is fixedly (e.g., adhesively) situated on the surface of the original mouthpiece cover of the handset 530 proximate the microphone 536. A switch 532 is situated on the handset 530 and can be manually actuated by the user to activate and deactivate the microphone disruption apparatuses 520 and 540. In some implementations, the switch 532 can be built into the microphone disruption apparatus 540. In further implementations, the switched 532 can be located on the housing of the desktop telephone 501.

Figure 6:
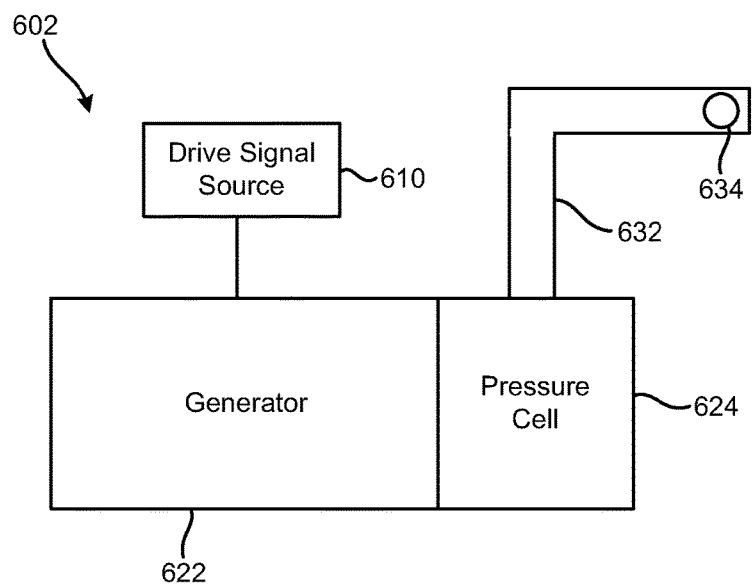
FIG. 6 is an illustration of a microphone disruption apparatus that employs air pressure for use with an electronic device having a microphone in accordance with various embodiments.

Turning now to FIG. 6, there is illustrated various components of a microphone disruption apparatus 602 in accordance with various embodiments. The apparatus 602 includes a generator 622 coupled to a pressure cell 624. The generator 622 receives a drive signal from a drive signal source 610. The pressure cell 624 is fluidly coupled to a plenum 632 (e.g., air channel) that extends between the pressure cell 624 and a location proximate the microphone of the electronic device to which the apparatus 602 is detachably affixed. A distal section of the plenum 632 includes an outlet port 634 which, when the apparatus 602 is properly positioned on the electronic device, is located adjacent an inlet port of the microphone of the electronic device. In some embodiments, a seal member (not shown, but see seals 326 and 426 of FIGS. 3 and 4, respectively) is disposed at the outlet port 634, which provides a fluidic seal between the plenum 632 and the inlet port of the microphone. The seal member may be formed from a compliant (e.g., lower durometer) material, such as silicone rubber, closed-cell foam, or other type of gasket.

Figure 7:
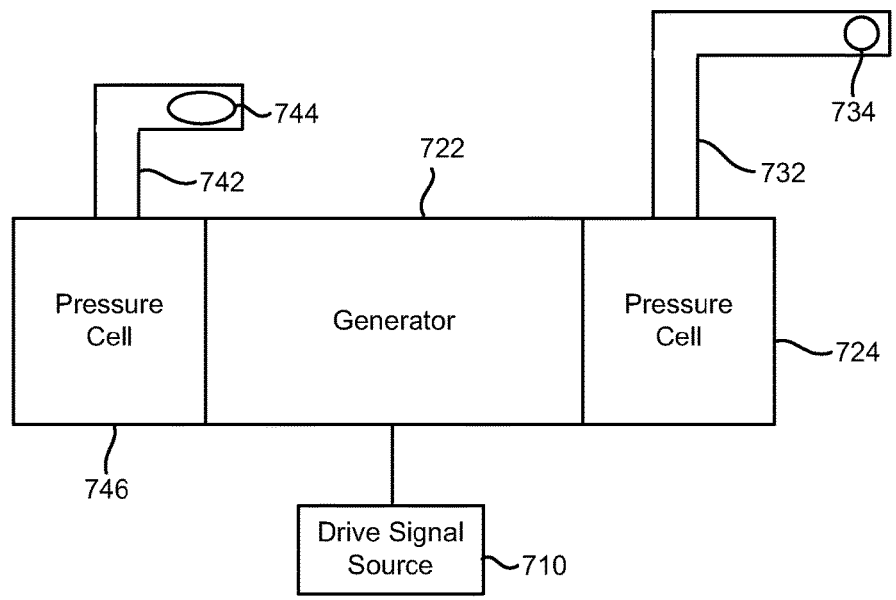
FIG. 7 is an illustration of a microphone disruption apparatus that employs air pressure for use with an electronic device having a multiplicity of microphones in accordance with various embodiments.

FIG. 7 illustrates various components of a microphone disruption apparatus 702 in accordance with other embodiments. The microphone disruption apparatus 702 shown in FIG. 7 is configured to disrupt a multiplicity of microphones of an electronic device to which the apparatus 702 is detachably affixed. In the embodiment shown in FIG. 7, the apparatus 702 includes a generator 722 configured to disrupt two microphones of an electronic device, it being understood that more than two microphones can be disrupted using a single generator. The apparatus 702 includes a generator 722 coupled to a first pressure cell 724 and a second pressure cell 746. The generator 722 receives a drive signal from a drive signal source 710. The first pressure cell 724 is fluidly coupled to a first plenum 732 (e.g., air channel) that extends between the first pressure cell 724 and a location proximate a first microphone of the electronic device to which the apparatus 702 is detachably affixed. A distal portion of the first plenum 732 includes a first outlet port 734 which, when the apparatus 702 is properly positioned on the electronic device, is located adjacent an inlet port of the first microphone. The second pressure cell 746 is fluidly coupled to a second plenum 742 (e.g., air channel) that extends between the second pressure cell 746 and a location proximate a second microphone of the electronic device to which the apparatus 702 is detachably affixed. A distal portion of the second plenum 742 includes a second outlet port 744 which, when the apparatus 702 is properly positioned on the electronic device, is located adjacent an inlet port of the second microphone. In some embodiments, a seal member (not shown) is disposed at one or both of the outlet ports 734 and 744.

In some implementations, the first and second microphones of the electronic device are disposed on different surfaces of the electronic device's housing, while in other implementations the first and second microphones are disposed on a common surface of the housing. It can be appreciated that, depending on the locations of the microphones, the plenums 732 and 742 can be configured to provide an relatively airtight conduit between the first and second pressure cells 724, 746 and the microphone locations, respectively. The plenums 732 and 742 can, therefore, be implemented to have a relatively complex three-dimensional shape, examples of which will be described hereinbelow. As with other components of the microphone disruption apparatus 702, the plenums 732 and 742 are affixed to the support structure of the apparatus 702, which may be a cover or partial cover that can be detachably affixed to the electronic device according to various embodiments.

Figure 8:
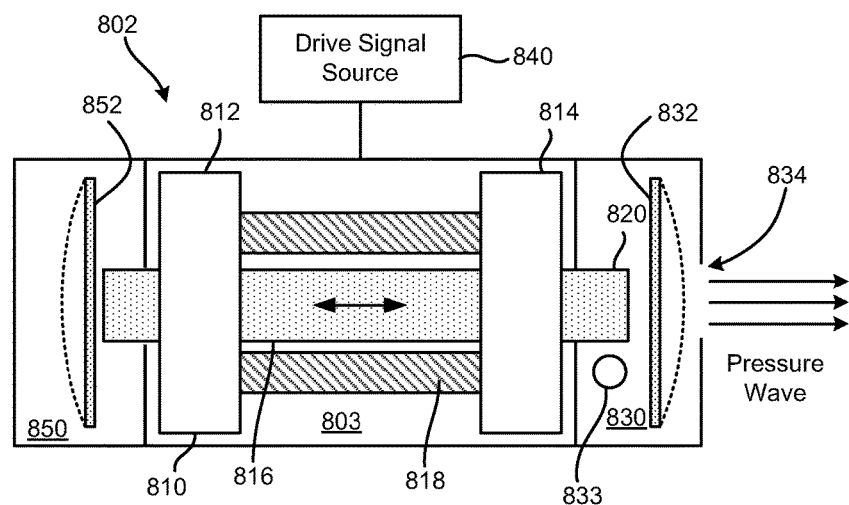
FIG. 8 illustrates of a microphone disruption apparatus that employs air pressure for use with an electronic device having a microphone in accordance with various embodiments.

FIG. 8 illustrates various details of a microphone disruption apparatus 802 in accordance with various embodiments. The apparatus 802 shown in FIG. 8 is configured to disrupt a microphone of an electronic device using air pressure. According to some embodiments, the apparatus 802 includes a motor or generator in the form of a voice coil constructed by winding fine magnet wire around a spool with a hollow core. Inside the core is a strong permanent magnet, and a second non-magnetic part having the same geometry as the magnet. This half-magnetic, half non-magnetic piston arrangement produces good efficiency in converting electrical energy into mechanical oscillating motion.

The apparatus 802 shown in FIG. 8 includes a generator 803 coupled to a pressure cell 830 and a rebound cell 850. The generator 803 includes a spool 810 comprising a first flange 812, a second flange 814, and a bobbin 816 extending between the first and second flanges 812 and 814. An electromagnet coil 818 is wound about the bobbin 816. The electromagnet coil 818 is coupled to a drive signal source 840. The bobbin 816 comprises a central bore dimensioned to receive a piston 820. The piston 820 includes at least some magnetic material which interacts with the electromagnetic field produced by the electromagnet coil 818 in response to drive signals received from the drive signals source 840. The piston 820, in response to the drive signals, translates axially in an oscillatory manner and at a relatively high rate within the central bore of the bobbin 816. During its axial excursions within the bobbin's central bore, the piston 820 extends beyond the first and second flanges 812 and 814 of the spool 810 during each excursion cycle.

The pressure cell 830 includes an outlet 834 and an inlet dimensioned to receive a first end of the piston 820. The pressure cell 830 supports a compliant membrane 832 which is subject to displacement in response to forcible contact with the piston 820. Repeated forced displacement of the complaint membrane 832 by the piston 820 causes displacement of air within the pressure cell 830 and production of a pressure wave. The pressure wave produced by the generator 803 is directed out of the pressure cell 830 via outlet port 834. The outlet port 834 of the pressure cell 830 is fluidly coupled to a plenum or air channel that extends between the microphone disruption apparatus 802 and a microphone of an electronic device to which the apparatus 802 is detachably affixed. In some implementations, the outlet port 834 is located on a surface of the pressure cell 830 that is off-axis (e.g., by about 45° to about 135°) relative to the axis of the piston 820. For example, the outlet port 834 can be oriented about 90° from the axis of the piston 820 (see, e.g., FIGS. 6 and 7). The off-axis orientation of the outlet port 834 relative to the piston 820 allows for a more compact plenum layout design in certain configurations. The pressure cell 830 also includes a porthole 833 which allows for voice sounds to travel to the native microphone of the electronic device when the generator 803 is inactive. The porthole 833 is covered when the generator 803 is active, such as by a flap that can be moved in and out of covered engagement with the porthole 833. Such a movable flap can be actuated by, or integral to, a switch that is actuated by the user when activating and deactivating the apparatus 802.

The generator 803 may include a rebound cell 850 which includes an inlet dimensioned to receive a second end of the piston 820 and a compliant membrane 852 situated proximate this inlet. According to some embodiments, the compliant members 832 and 852 can be implemented as $\frac{1}{32}$" thick, 10 A durometer silicone rubber membranes. In some embodiments, the rebound cell 850 may include a spring instead of, or in addition to, the compliant membrane 852. Forcible contact between the second end of the piston 820 and the compliant membrane 852 results in a rebound force that serves to redirect the piston 820 towards the pressure cell 830. It is noted that in some embodiments, a rebound cell 830 is not needed, and that the electromagnetic interaction between the electromagnet coil 818 and the magnetic material of the piston 820 is sufficient to redirect the piston 820 towards the pressure cell 830 to achieve a desired cycling rate.

The drive signal produced by the drive signals source 840 can be selected to achieve a desired level of microphone disruption. In addition to disrupting microphone function, the drive signal can be selected to provide for a low level of noise produced by the generator 803 during operation, so as to avoid disturbing the user of the electronic device. In some embodiments, the drive signals source 840 can produce a low frequency sine wave (e.g., from about 50-150 Hz, such as about 100 Hz). A low frequency sine wave has been shown to create very little mechanical noise that can be perceived by the user, while still causing microphone clipping to occur sufficiently fast so as to obscure audio frequency information. The drive signal source 840 can generate other waveforms, such as white, brown or pink noise, low-pass filtered noise, or more complex audio signals, such as music or speech that can also be used to clip the microphone and mask private information. In some embodiments, the drive signal source 840 can be configured to produce a signal containing significant high harmonics that can generate mechanical vibrations that couple into the housing of the electronic device, and ultimately produce undesirable audible noise at the microphone. In other embodiments, the apparatus 802 can include an auxiliary microphone (see, e.g., FIGS. 16 and 17) that receives a user's voice sounds. A processor, coupled to the auxiliary microphone, can be configured to invert the audio signal generated from the received user's voice sounds. The drive signal source 840 can drive the generator 803 using at least the inverted audio signal as a drive signal. This approach can provide for both microphone clipping and cancelation of any user voice sounds picked up by the native microphone of the electronic device.

Figure 9:
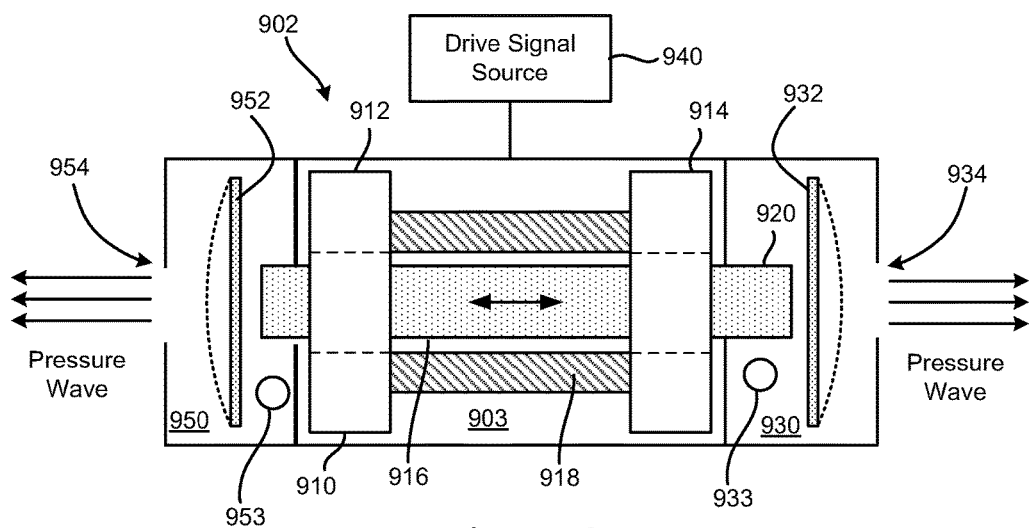
FIG. 9 illustrates of a microphone disruption apparatus that employs air pressure for use with an electronic device having a multiplicity of microphones in accordance with various embodiments.

FIG. 9 illustrates various details of a microphone disruption apparatus 902 in accordance with various embodiments. The apparatus 902 shown in FIG. 9 is configured to disrupt two microphones of an electronic device using air pressure produced by a single generator 903. The generator 903 is coupled to a first pressure cell 830 and a second pressure cell 950. The generator 903 includes a spool 910 comprising a first flange 912, a second flange 914, and a bobbin 916 having an axial bore extending between the first and second flanges 912 and 914. An electromagnet coil 918 is wound about the bobbin 916, and is coupled to a drive signal source 940. A piston 920, which includes at least some magnetic material, interacts with the electromagnetic field produced by the electromagnet coil 918 in response to drive signals received from the drive signals source 940. The piston 920, in response to the drive signals, translates axially in an oscillatory manner and at a relatively high rate within the central bore of the bobbin 916, extending beyond the first and second flanges 912 and 914 of the spool 910 during each excursion cycle.

The first pressure cell 930 includes an outlet 934 and an inlet dimensioned to receive a first end of the piston 920. The first pressure cell 930 supports a compliant membrane 932 which is subject to displacement in response to forcible contact with the first end of the piston 920. Repeated forced displacement of the complaint membrane 932 by the piston 920 causes displacement of air within the first pressure cell 930 and production of a pressure wave, which is communicated out of an outlet port 934 of the first pressure cell 930. The outlet port 934 is fluidly coupled to a plenum or air channel that extends between the microphone disruption apparatus 902 and a first microphone of an electronic device to which the apparatus 902 is detachably affixed.

The second pressure cell 950 includes an outlet 954 and an inlet dimensioned to receive a second end of the piston 920. The second pressure cell 950 supports a compliant membrane 952 which is subject to displacement in response to forcible contact with the second end of the piston 920. Repeated forced displacement of the complaint membrane 952 by the piston 920 causes displacement of air within the second pressure cell 930 and production of a pressure wave, which is communicated out of an outlet port 954 of the second pressure cell 950. The outlet port 954 is fluidly coupled to a second plenum or air channel that extends between the microphone disruption apparatus 902 and a second microphone of an electronic device to which the apparatus 902 is detachably affixed. In some implementations, one or both of the outlet ports 934 and 954 can be located on a surface of their respective pressure cell 930 and 950 that is off-axis (e.g., by about 45° to about 135°, such as 90°) relative to the axis of the piston 920. The pressure cells 930 and 950 each include a porthole 933 and 953 which allows for voice sounds to travel to respective native microphones of the electronic device when the generator 903 is inactive. As discussed previously, the portholes 933 and 953 are covered during operation of the generator 903.

According to some embodiments, the housing of the generator and the pressure/rebound cells can be fashioned out of mu-metal for magnetic shielding of the motor magnet. In some embodiments, the spool of the generator can be made of Delrin plastic, which has good inherent lubricity and other physical properties.

Figure 10:
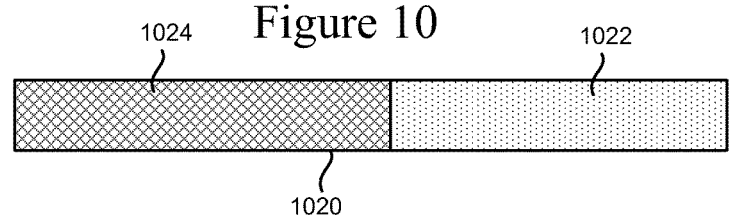
FIG. 10 shows a two-piece piston of a pressure generator in accordance with various embodiments.
Figure 11:
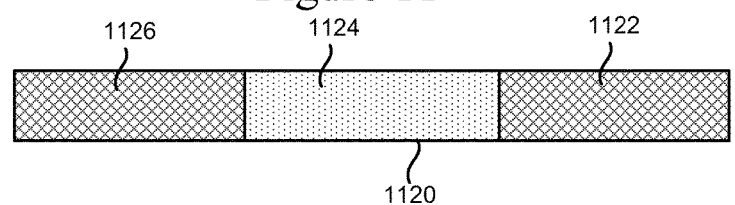
FIG. 11 shows a three-piece piston of a pressure generator in accordance with various embodiments.

FIGS. 10-12 illustrate various configurations of a piston that can be used in a generator of a microphone disruption apparatus in accordance with various embodiments. The piston 1020 shown in FIG. 10 includes a first section 1022 and a second section 1024. The second section 1024 includes permanent magnetic material, such as Neodymium/Iron/Boron (NdFeB). The first section 1022 comprises non-magnetic material, such as plastic or rubber. When installed within the central bore of the bobbin of a generator, such as those shown in FIGS. 8 and 9, the piston 1020 is positioned within the central bore such that the second section 1024 containing permanent magnetic material is near the center of the electromagnet coil and the first section 1022 is near the flange adjacent the compliant membrane of the pressure cell.

FIG. 11 shows a double-ended piston 1120 which includes a first section 1122, a second section 1124, and a third section 1126. Each of the first and third sections 1122 and 1126 comprise permanent magnetic material, while the intervening second section 1124 comprises a non-magnetic material, such as plastic or rubber. Provision of magnetic material at opposing and sections of the piston 1120 shown in FIG. 11 provides for enhanced electromagnetic interaction between the piston 1120 and the electromagnet coil of the generator. For example, the displacement rate of, and impact force created by, the double-ended piston 1120 can be increased relative to a single-ended piston, such as that shown in FIG. 10.

Figure 12A:
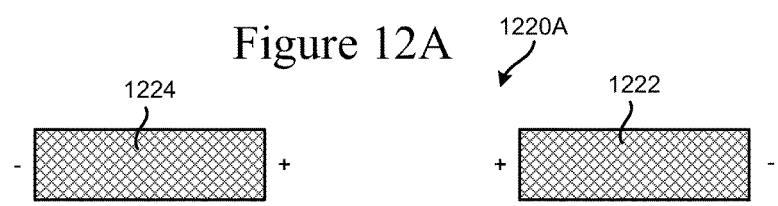
FIGS. 12A-12C show different configurations of a two-piece piston of a pressure generator in accordance with various embodiments.
Figure 12B:
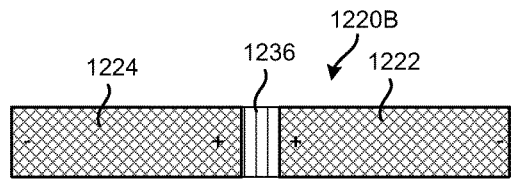
Figure 12C:
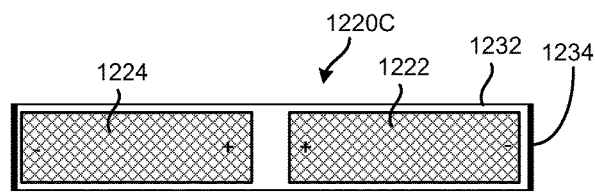

FIGS. 12A-12C show different configurations of a two-piece piston of a pressure generator in accordance with various embodiments. FIG. 12A illustrates a piston 1220A comprising a first magnetic section 1222 and a second magnetic section 1224. In the configuration shown in FIG.

12A, the two magnetic sections 1222 and 1224 are separated by space (e.g., a void or an air gap), such that no intervening structure or material connects the two magnetic sections 1222 and 1224. The two magnetic sections 1222 and 1224 are positioned with like poles oriented towards each other, in a magnetically repelling relationship. The relative position and movement of the two magnetic sections 1222 and 1224 is moderated by the electromagnetic field created by the electromagnet coil of the generator.

In the embodiment shown in FIG. 12B, a piston 1220B comprises a first magnetic section 1222, a second magnetic section 1224, and a binding material or layer 1236 that mechanically connects the first and second magnetic sections 1222, 1224. The binding material or layer 1236 may be an adhesive, glue, or other binding material. The two magnetic sections 1222 and 1224 are positioned with like poles oriented towards each other, in a magnetically repelling relationship. In the embodiments illustrated in FIG. 12C, a piston 1220C comprises a first magnetic section 1222 and a second magnetic section 1224 disposed in a thin-walled sleeve or sheath 1232. End caps 1234 can be included to enclose the first and second magnetic sections 1222, 1224 within the sheath 1232. The two magnetic sections 1222 and 1224 are positioned with like poles oriented towards each other, in a magnetically repelling relationship. In some configurations, a binding material or layer can be used to mechanically connect the first and second magnetic sections 1222, 1224 (see, e.g., material 1236 of FIG. 12B).

Figure 13A:
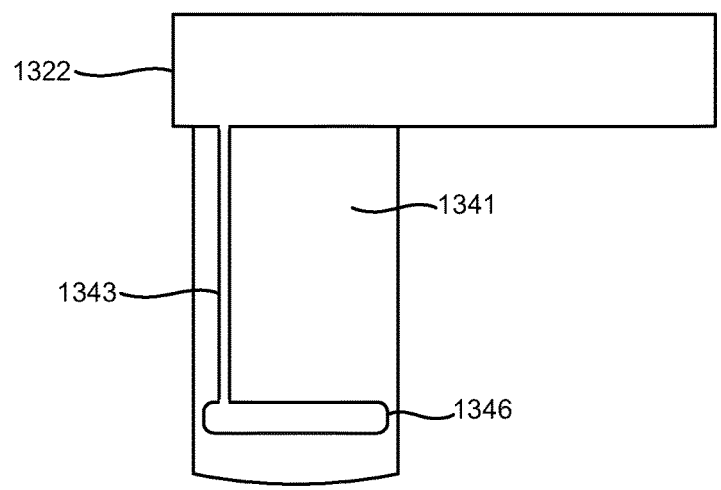
FIG. 13A illustrates a plenum configured to fluidly couple a microphone disruption apparatus to a microphone of an electronic device in accordance with various embodiments.

FIG. 13A illustrates a plenum 1341 configured to fluidly couple a microphone disruption apparatus to a microphone of an electronic device in accordance with various embodiments. The plenum 1341 is configured to provide fluidic coupling between an air pressure generator 1322 and a microphone disposed at or just below a surface of the device housing. For example, the microphone may be disposed on a front major surface of the device housing near the upper edge surface of the device housing. The plenum 1341 shown in FIG. 13A includes a void or channel 1343 that extends between the generator 1322 and an outlet port 1346, and can be pressurized by the generator 1322. The outlet port 1346 is configured to generally conform to the shape of the microphone's inlet port. The outlet port 1346 may include a seal or gasket to enhance fluidic coupling with the microphone.

Figure 13B:
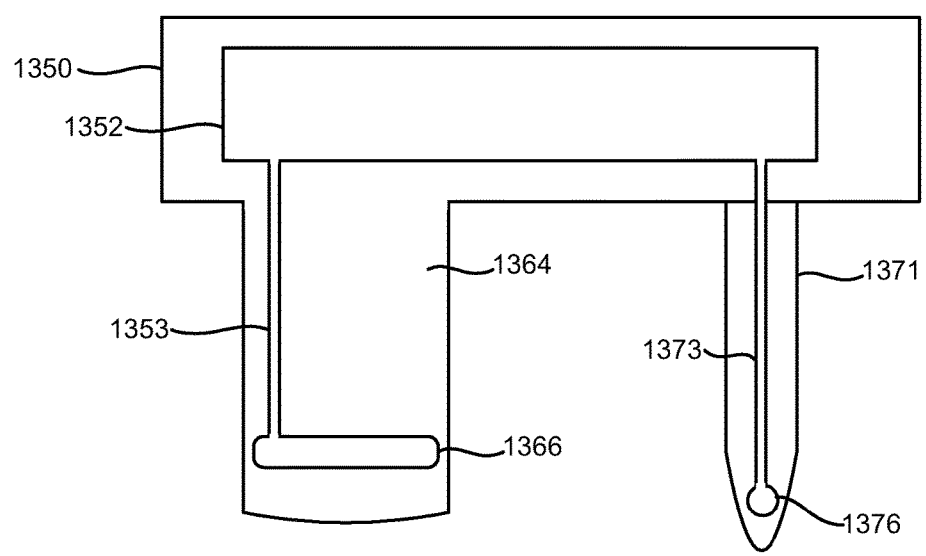
FIG. 13B illustrates a manifold comprising a multiplicity of plenums configured to fluidly couple a microphone disruption apparatus to a multiplicity of microphones disposed at different housing locations of an electronic device in accordance with various embodiments.

FIG. 13B illustrates a manifold 1350 comprising a multiplicity of plenums configured to fluidly couple an air pressure generator 1352 to a multiplicity of electronic device microphones in accordance with various embodiments. The manifold 1350 includes a first plenum 1364 and a second plenum 1371. The first and second plenums 1364 and 1371 each define a void or channel 1353, 1373 in the manifold material, which can be pressurized by an individual or a common generator of a type previously described. The first plenum 1364 provides fluidic coupling between the generator 1352 and a first microphone of the electronic device. The first plenum 1364 is shown to include an outlet port 1366 which has a shape similar to that of the inlet port of a first microphone of the electronic device (which may be on a front surface of the electronic device housing). The outlet port 1366 may further include a seal arrangement to provide enhanced fluidic coupling between the plenum 1364 and the inlet port of the first microphone. The second plenum 1371 is shown to include an outlet port 1376 which has a shape similar to that of the inlet port of a second microphone of the electronic device (which may be provided on a different surface of the electronic device housing, such as a rear surface). The outlet port 1376 may further include a seal arrangement to provide enhanced fluidic coupling between the second plenum 1371 and the inlet port of the second microphone.

In the representative embodiment shown in FIG. 13B, a common generator 1352 is configured to fluidly couple to the first and second plenums 1364 and 1371. In some embodiments, the first and second plenums 1364 and 1371 can be fluidly independent of each other, such that each is coupled to a different generator.

Figure 14:
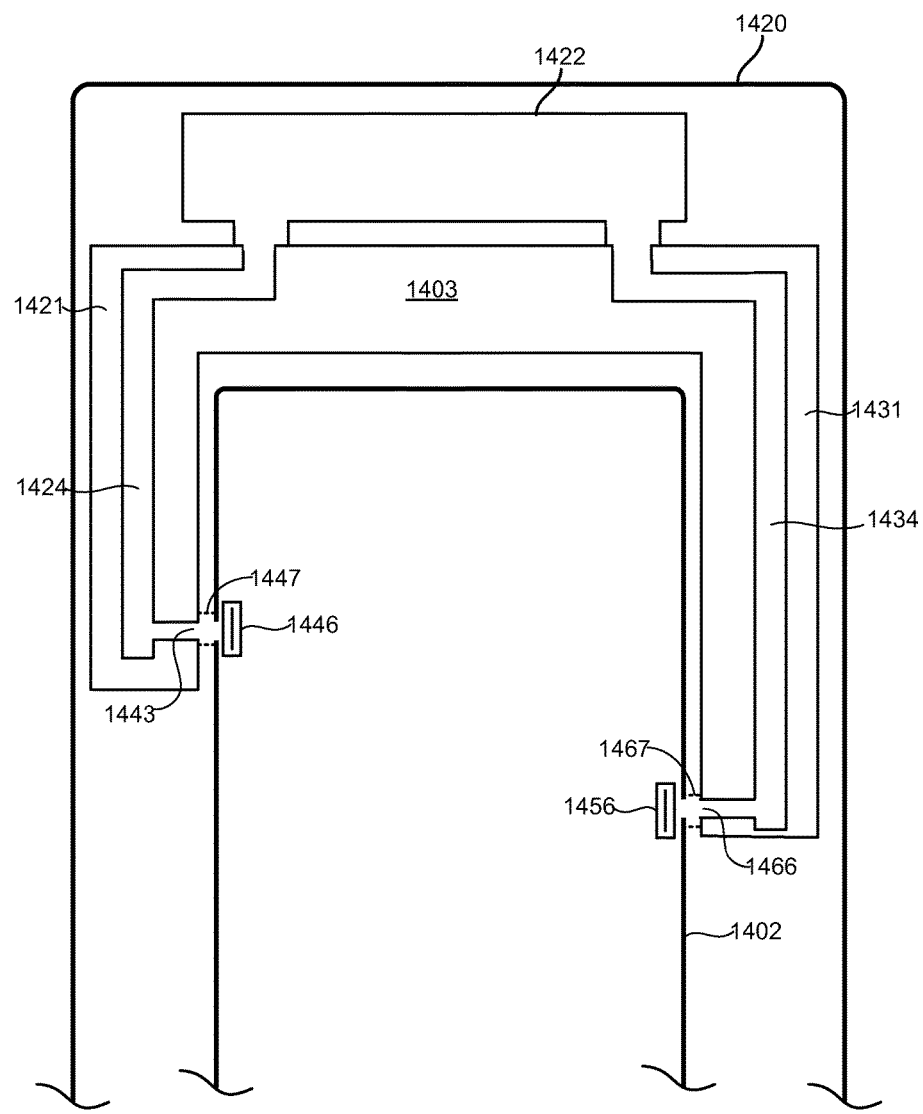
FIG. 14 is a side view of a manifold comprising a multiplicity of plenums configured to fluidly couple a microphone disruption apparatus to a multiplicity of microphones disposed on opposing major surfaces of an electronic device in accordance with various embodiments.

FIG. 14 is an side view of a manifold 1403 comprising a multiplicity of plenums configured to fluidly couple an air pressure generator 1422 to a multiplicity of electronic device microphones in accordance with various embodiments. FIG. 14 demonstrates that a microphone disruption apparatus according to various embodiments can employ plenums having fairly complex configurations depending on the positioning of one or more microphones of an electronic device to which the apparatus is detachably affixed. The manifold 1403 and generator 1422 are shown mounted within a cover 1420 which is configured to be detachable affixed to an electronic device 1402 having a first microphone 1446 and a second microphone 1456. The manifold 1403 includes a first plenum 1421 and a second plenum 1431. The first and second plenums 1421 and 1431 each define a void or channel 1424, 1434 in the manifold material, which can be pressurized by an individual or a common generator (e.g., generator 1422) of a type previously described. The first plenum 1424 provides fluidic coupling between the generator 1422 and the first microphone 1446 of the electronic device 1402. The first plenum 1421 is shown to include an outlet port 1443 which has a shape similar to that of the inlet port of a first microphone 1446 (which may be on a front surface of the electronic device housing). The outlet port 1443 may further include a seal arrangement 1447 to provide enhanced fluidic coupling between the plenum 1421 and the inlet port of the first microphone 1446. The second plenum 1431 is shown to include an outlet port 1466 which has a shape similar to that of the inlet port of a second microphone 1456 (which may be provided on a different surface of the electronic device housing, such as a rear surface). The outlet port 1466 may further include a seal arrangement 1467 to provide enhanced fluidic coupling between the second plenum 1431 and the inlet port of the second microphone 1456.

Figure 15:
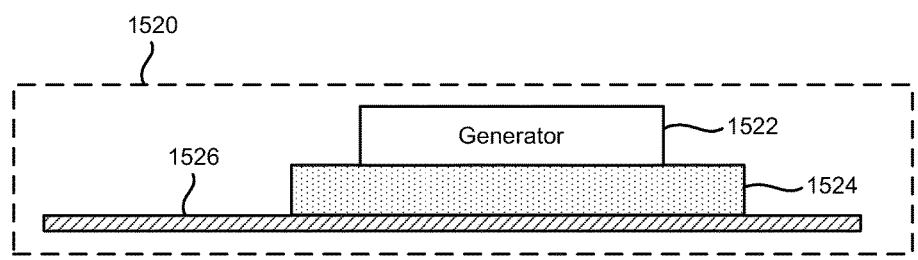
FIG. 15 is a cross-sectional illustration showing a vibration isolation arrangement for a microphone disruption apparatus in accordance with various embodiments.

FIG. 15 is a cross-sectional illustration showing a vibration isolation arrangement for a microphone disruption apparatus 1520 in accordance with various embodiments. In the representative example shown in FIG. 15, a generator 1522 is supported by a substrate 1526 and a vibration absorption element 1524 is disposed between the generator 1522 and the substrate 1526. The vibration absorption element 1524 is formed from a material that can dampen mechanical vibrations produced by the generator 1522, such as silicone rubber.

Figure 16:
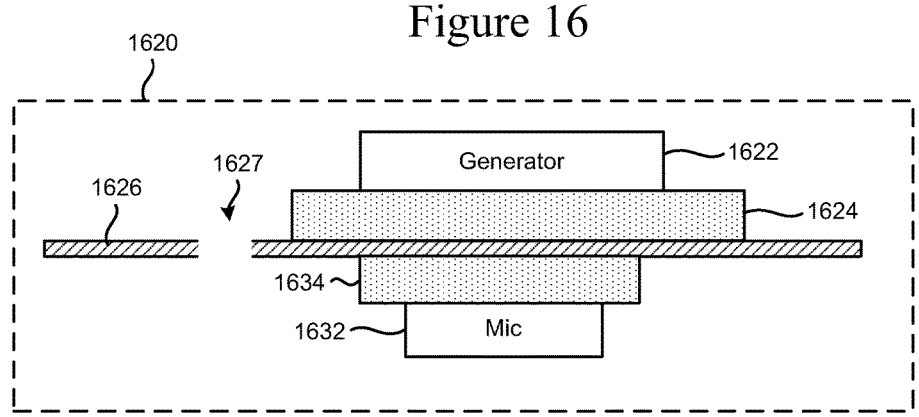
FIG. 16 is a cross-sectional illustration showing a vibration isolation arrangement for a microphone disruption apparatus in accordance with various embodiments.

FIG. 16 is a cross-sectional illustration showing a vibration isolation arrangement for a microphone disruption apparatus 1620 in accordance with various embodiments. In the representative example shown in FIG. 16, a generator 1622 is supported by a substrate 1626 and a vibration absorption element 1624 is disposed between the generator 1622 and the substrate 1626. According to some embodiments, the microphone disruption apparatus 1620 can incorporate an auxiliary microphone 1632 which can be used to facilitate secured conversations when the microphone(s) of the electronic device is/are being disrupted by the microphone disruption apparatus 1620. In such embodiments, the auxiliary microphone 1632 can be communicatively coupled to an auxiliary processor (also supported by the cover, sleeve or band) configured to encrypt the audio signals received from the auxiliary microphone 1632. The encrypted audio signals can then be transmitted from the auxiliary processor to the electronic device's communication circuitry for transmission through the device's normal communication link (and then decrypted on the receiving end). In addition to use of vibration absorption element 1624 for the generator 1622, an additional vibration absorption element 1634 can be used to dampen vibration between the auxiliary microphone 1632 and the substrate 1626 and/or generator 1622.

As illustrated, the auxiliary microphone 1632 is mounted on a lower surface of the substrate 1626, while the generator 1622 is mounted on an upper surface of the substrate 1626. In such implementations, a whole or void 1627 is provided in the substrate 1626 to allow sound to impinge the auxiliary microphone 1632. It is understood that in some embodiments, the auxiliary microphone 1632 and vibration absorption element 1634 can be mounted on the same surface as that supporting the generator 1622.

Figure 17:
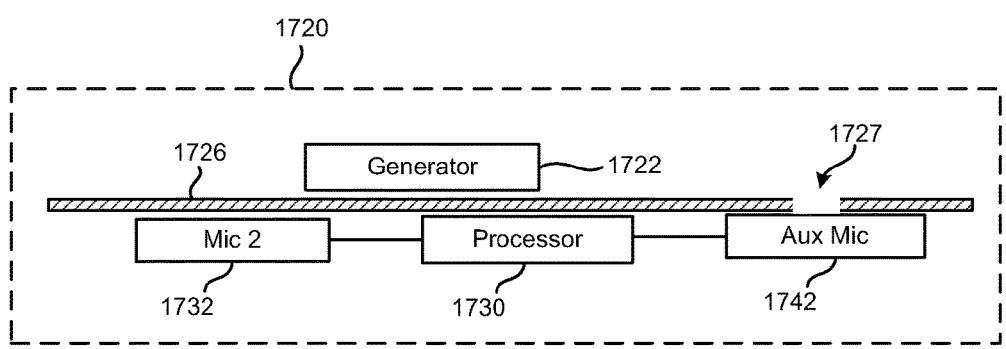
FIG. 17 is a cross-sectional illustration showing a noise cancellation arrangement for a microphone disruption apparatus in accordance with various embodiments.

FIG. 17 is a cross-sectional illustration showing a noise cancellation arrangement for a microphone disruption apparatus 1720 in accordance with various embodiments. In this illustrative example, an auxiliary microphone 1742 is used to facilitate secured conversations when the microphone or microphones of the electronic device are being disrupted by the microphone disruption apparatus 1720. The noise cancellation arrangement shown in FIG. 17 includes a generator 1770 situated on a first surface of a substrate 1726. A second microphone 1732 and the auxiliary microphone 1742 are mounted on an opposing surface of the substrate 1726. A processor 1730 is coupled to the two microphones 1732 in 1742. A void or hole 1727 is provided in the substrate 1726 to allow externally produced sound (e.g., voice sounds from a user) to reach the auxiliary microphone 1742.

The second microphone 1732 is configured to pick up noise created by the generator 1722 during operation. The second microphone 1732 is isolated from receiving externally produced sound (e.g., voice sounds from a user). In some implementations, the auxiliary microphone 1742 is mounted on vibration absorption material (not shown). Enhanced noise reduction can be achieved by canceling generator noise that may be detected by the auxiliary microphone 1742 using an audio signal produced by the second microphone 1732. For example, an audio signal produced by the second microphone 1732 (and containing generator noise) can be inverted by the processor 1730 and summed with an audio signal produced by the auxiliary microphone 1742 to cancel the generator noise using known techniques.

Figure 18:
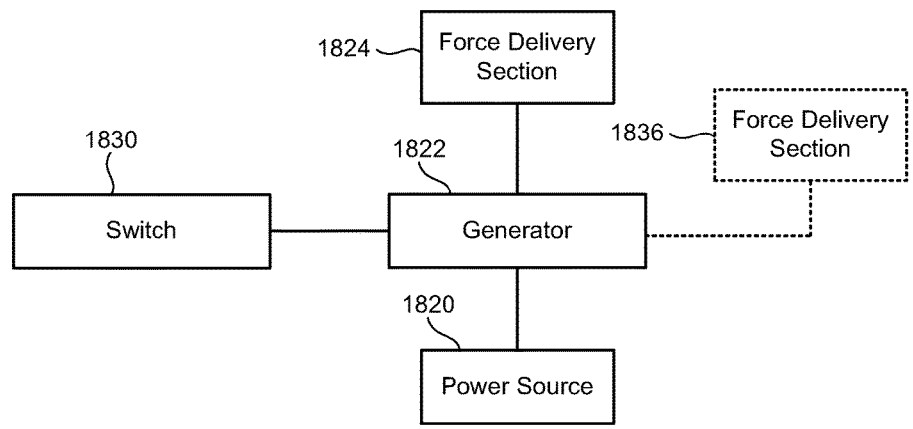
FIG. 18 is a block diagram showing various components of a microphone disruption apparatus in accordance with some embodiments.

FIG. 18 is a block diagram showing various components of a microphone disruption apparatus in accordance with some embodiments. The microphone disruption apparatus shown in FIG. 18 includes a generator 1822, which can be a pressure, electric or mechanical force generator for example. The generator 1822 is coupled to one or more force delivery sections or elements 1824, 1836. Examples of force delivery sections or elements 1824, 1836 include a pressure outlet port, a vibration element or an electrical element (e.g., a charge plate). The generator 1822 and/or one or more of the force delivery sections or elements 1824, 1836 are coupled to a power source 1820, such as a battery. A switch 1830 is coupled to the generator 1822 and power source 1820, providing for selective activation and deactivation of the microphone disruption apparatus.

Figure 19:
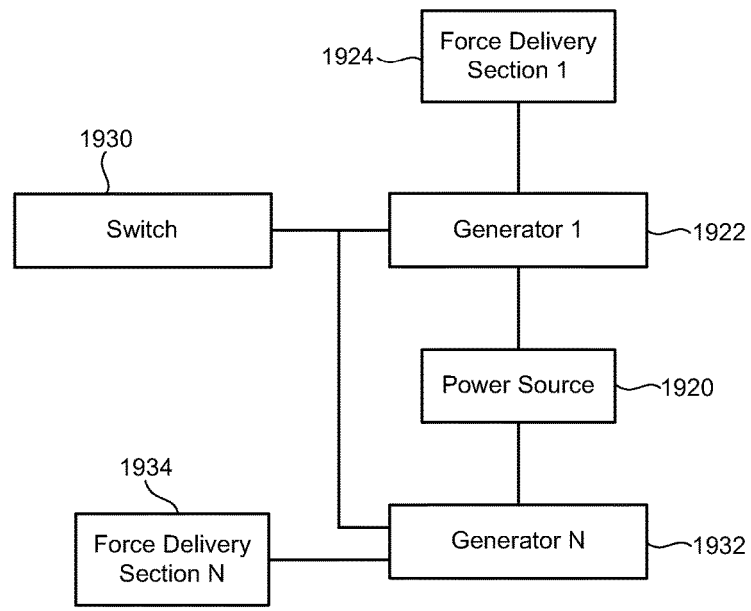
FIG. 19 is a block diagram showing various components of a microphone disruption apparatus in accordance with some embodiments.

FIG. 19 is a block diagram showing various components of a microphone disruption apparatus in accordance with other embodiments. The microphone disruption apparatus shown in FIG. 18 includes a multiplicity of generators 1922, 1932, which can be a pressure, electric or mechanical force generator for example (e.g., the same type or different types). The generators 1922, 1932 are coupled to respective force delivery sections or elements 1924, 1934 (e.g., a pressure outlet port, a vibration element or an electrical element). The generators 1922, 1932 and/or one or more of the force delivery sections or elements 1924, 1934 are coupled to a power source 1920, such as a battery. A switch 1930 is coupled to the generators 1922, 1932 and power source 1920, providing for selective activation and deactivation of the microphone disruption apparatus.

Figure 20:
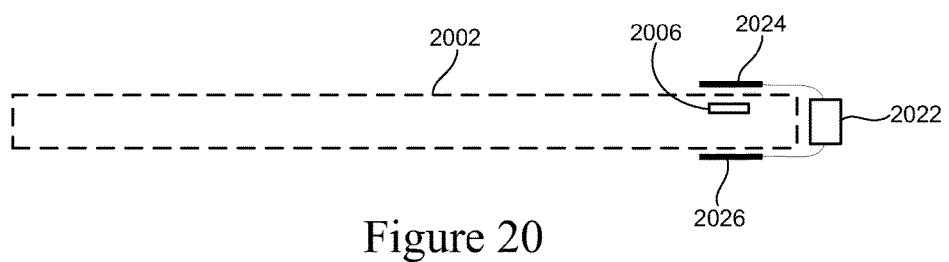
FIG. 20 illustrates a microphone disruption apparatus configured to produce an electric force that renders a microphone nonresponsive to audio sounds in accordance with various embodiments.

FIG. 20 illustrates a microphone disruption apparatus configured to produce an electric force that renders a microphone nonresponsive to audio sounds in accordance with various embodiments. The apparatus shown in FIG. 20 includes a generator 2022 electrically coupled to a pair of conducting plates 2024 and 2026 positioned relative to a microphone 2006 of an electronic device 2002. As illustrated, the conducting plates 2024 and 2026 are positioned so that the microphone 2006 is located between the conducting plates 2024 and 2026. The generator 2022 provides a voltage drive signal to the conducting plates 2024 and 2026. In response to the voltage drive signal, an alternating electric charge is developed on the conducting plates, causing an electric force to interfere with the charged diaphragm in the microphone (e.g., in an electret condenser microphone).

Figure 21:
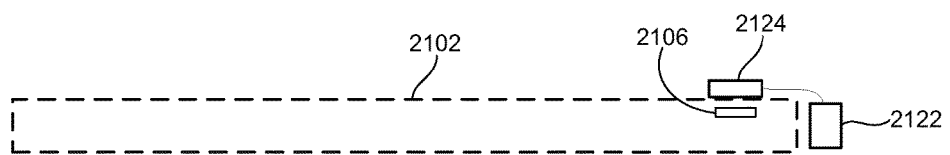
FIG. 21 illustrates a microphone disruption apparatus configured to produce a mechanical force that renders a microphone nonresponsive to audio sounds in accordance with various embodiments.

FIG. 21 illustrates a microphone disruption apparatus configured to produce a mechanical force that renders a microphone nonresponsive to audio sounds in accordance with various embodiments. The apparatus shown in FIG. 21 includes a generator 2122 electrically coupled to a vibrator 2124 positioned relative to a microphone 2006 of an electronic device 2002. The generator 2122 provides a voltage drive signal to the vibrator 2124, causing the vibrator 2124 to deliver a complex mechanical vibration to the housing of the electronic device 2102, that couples through to the microphone 2106.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An apparatus for use with an electronic device having a microphone, the apparatus comprising:
    a structure configured to detachably couple to the device; and
    a generator supported by the structure, the generator configured to be selectively activated and deactivated by a user, the generator being configured to generate a force that acts on the microphone and renders the microphone unresponsive to sound upon being activated by the user.

2. The apparatus of claim 1, wherein the generator is configured to generate a pressure force, an electric force or a mechanical force.

3. The apparatus of claim 1, wherein the generator is coupled to the microphone.

4. The apparatus of claim 1, further comprising:
a plenum supported by the structure, the plenum configured to couple the generator to the microphone.

5. The apparatus of claim 4, wherein the plenum comprises an inlet port and an outlet port, the inlet port of the plenum configured to couple to the generator and the outlet port configured to couple to the microphone.

6. The apparatus of claim 1, further comprising:
a first auxiliary microphone supported by the structure and configured to receive voice sounds during a time in which the generator is active and the microphone of the device is rendered unresponsive to voice sounds.

7. The apparatus of claim 1, wherein the structure comprises a cover or a sleeve configured to detachably couple to the device.

8. An apparatus for use with an electronic device having a microphone, the apparatus comprising:
a structure configured to detachably couple to the device; and
a generator supported by the structure and coupled to the microphone, the generator configured to generate a force that acts on the microphone and renders the microphone unresponsive to sound.

9. The apparatus of claim 8, wherein the generator is configured to be selectively activated and deactivated by a user.

10. The apparatus of claim 8, wherein the generator is located proximate to the microphone.

11. The apparatus of claim 8, wherein the generator is fluidly coupled to the microphone.

12. The apparatus of claim 8, further comprising:
a plenum supported by the structure, the plenum configured to couple the generator to the microphone.

13. The apparatus of claim 8, wherein:
the generator is configured to render the microphone unresponsive to voice sounds upon being activated; and
the microphone is one of a dynamic microphone, a condenser microphone, an electret microphone, a ribbon microphone, a piezoelectric microphone, a fiber optic microphone, and a MEMS microphone.

14. The apparatus of claim 12, further comprising a plenum supported by the structure and comprising an inlet port and an outlet port, the inlet port of the plenum configured to fluidly couple to the generator and the outlet port configured to fluidly couple to the microphone.

15. The apparatus of claim 8, wherein:
the generator is configured to render the microphone unresponsive to voice sounds upon being activated; and
the generator is configured to generate a pressure force, an electric force, or a mechanical force.

16. An apparatus for use with an electronic device having a plurality of microphones, the apparatus comprising:
a structure configured to detachably couple to the device; and
a generator supported by the structure, the generator is configured to generate a force that acts on the plurality of microphones and renders the plurality of microphones unresponsive to sound.

17. The apparatus of claim 16, wherein the generator is fluidly coupled to a first microphone and a second microphone.

18. The apparatus of claim 17, wherein the generator is configured to generate a force that acts on the first microphone and the second microphone.

19. The apparatus of claim 18, further comprising:
a first plenum fluidly coupled to the first microphone; and
a second plenum fluidly coupled to the second microphone.

20. The apparatus of claim 16, wherein the generator is configured to generate a pressure force, an electric force, or a mechanical force which actions on the plurality of microphones.

21. The apparatus of claim 16, wherein the generator comprises:
a first pressure cell configured to generate air pressure that acts on a first microphone and renders the first microphone unresponsive to voice sounds; and a second pressure cell configured to generate air pressure that acts on a second microphone and renders the second microphone unresponsive to voice sounds.

* * * * *